T. N. WHEELER.
Quilting-Frames.

No. 158,659.

2 Sheets--Sheet 1.

Patented Jan. 12, 1875.

Witnesses:
Henry N. Miller
N. P. Du Hamel

Inventor.
Thomas N. Wheeler.
Per
H. S. Abbot.
Attorney.

T. N. WHEELER.
Quilting-Frames.

No. 158,659.

2 Sheets--Sheet 2.

Patented Jan. 12, 1875.

UNITED STATES PATENT OFFICE.

THOMAS N. WHEELER, OF BLUE EARTH CITY, MINNESOTA.

IMPROVEMENT IN QUILTING-FRAMES.

Specification forming part of Letters Patent No. 158,659, dated January 12, 1875; application filed June 2, 1874.

*To all whom it may concern:*

Be it known that I, T. NORTHRUP WHEELER, of Blue Earth City, county of Faribault and State of Minnesota, have invented certain new and useful Improvements in Combined Quilting-Frame and Clothes-Drier, of which the following is a specification:

The nature of my invention consists in the construction and arrangement of a combined quilting-frame and clothes-drier, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
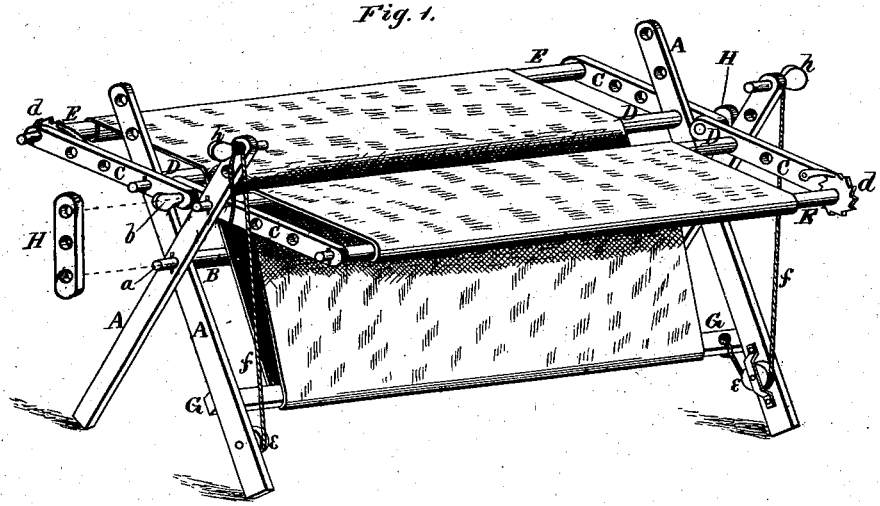
Figure 2:
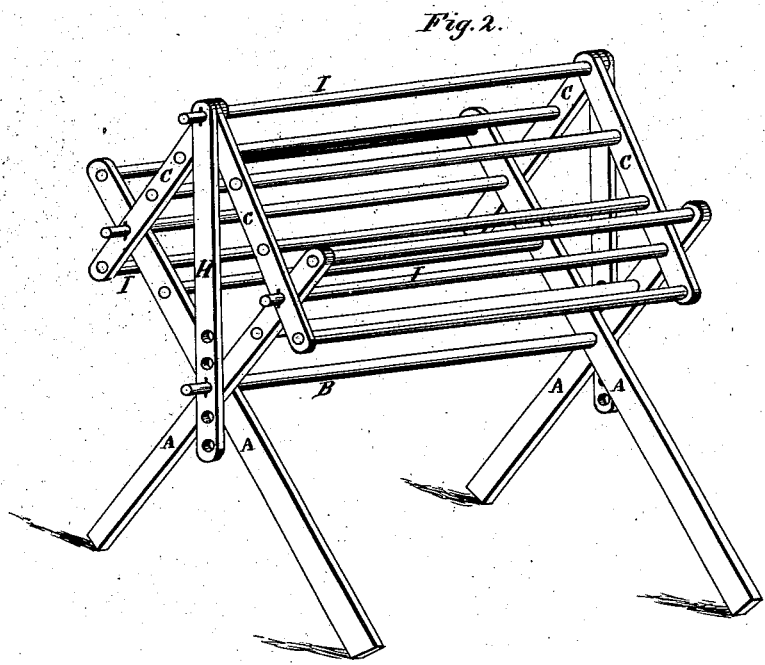

Figure 1 is a perspective view of my invention, showing it arranged as a quilting-frame; and Fig. 2 is a similar view thereof, showing it arranged as a clothes-drier.

Each end of the frame is composed of two bars or standards, A A, which are pivoted together at or near the center by a rod, B, having a tenon, $a$, formed on each end, and each of said tenons passing through two standards, and held by a pin through each tenon. The upper end of each standard A has a series of holes for the adjustment of arms C C at any desired height thereon. There is one of these arms C to each standard A, and the corresponding arms at the two ends of the frame are pivoted to their standards by a bar, D, having tenoned ends passing through them. The inner ends of the two arms at each end of the frame are pivoted together by a pin, $b$.

This constitutes the main frame, which is used with other devices to form a quilting-frame or a clothes-drier, as desired.

When it is to be used as a quilting-frame a roller, E, is placed in the outer ends of the arms on each side of the frame, said roller having at one end an ordinary pawl-and-ratchet device, $d$. The quilt is fastened in the ordinary manner to the rollers E E, and the center of the quilt passes down between the bars D D, and under a tension-bar, G. A cord, $f$, is fastened to each end of the tension-bar G, and passes around a pulley, $e$, on the inner side near the foot of one of the standards A, and its end is fastened by a pin, $h$, in one of the upper holes on the other standard.

The quilt may be easily unrolled from one roller, E, and rolled up on the other, as required, and at all times held taut by the cords $f$ and tension-bar G.

Both sides may be used at one time, and in that case the inner ends of the arms C C are connected by the pins $b$, as above mentioned, and a perforated bar, H, connects said pin with the tenon $a$ below to hold the arms out horizontal. When only one side is to be used the other side may be let down by simply removing the pins $b$, and inserting them only through the bar H and the end of that arm which is to be held horizontal.

This same device may be used as a clothes-drier by simply removing the rollers E and tension-bar G, and inserting bars I through the various holes in the perforated arms C C, and said arms may be held horizontal, or at any angle desired, by merely shifting their position on the standards, and shifting the bars H, which will hold the arms in any position.

Having thus fully described my invention, what I claim as new, and desire to secure by Letters Patent, is—

The combination, with the frame A B C D, of the rollers E, tension-bar G, cords $f$, pulleys $e$, and pins $h$, all substantially as and for the purposes herein set forth.

In testimony that I claim the foregoing as my invention, I hereunto affix my signature this 15th day of May, 1874.

THOMAS N. WHEELER.

Witnesses:
M. E. GANO,
FRED. A. WHEELER.